US 6,698,257 B2

(12) United States Patent  
Kulas

(10) Patent No.: US 6,698,257 B2
(45) Date of Patent: Mar. 2, 2004

(54) MOTORCYCLE HELMET LOCK USING FRONT FORK LOCK

(76) Inventor: Charles J. Kulas, 244 Texas St., San Francisco, CA (US) 94107

( * ) Notice: Subject to any disclaimer, the term of this patent is extended or adjusted under 35 U.S.C. 154(b) by 0 days.

(21) Appl. No.: 10/165,735

(22) Filed: Jun. 7, 2002

(65) Prior Publication Data

US 2003/0226383 A1 Dec. 11, 2003

(51) Int. Cl.⁷ .............................................. E05B 69/00
(52) U.S. Cl. ..................... 70/59; 70/14; 70/18; 70/233; 224/413
(58) Field of Search ............................ 70/58, 59, 233, 70/232, 14, 18; 224/413

(56) References Cited

U.S. PATENT DOCUMENTS

| 3,646,786 | A | * | 3/1972 | Baker | 70/59 |
| 3,762,191 | A | * | 10/1973 | Smith | 70/18 |
| 3,779,597 | A | * | 12/1973 | Uchida | 296/37 |
| 3,798,934 | A | * | 3/1974 | Wright et al. | 70/59 |
| 3,805,565 | A | * | 4/1974 | McLarnon | 70/59 |
| 3,823,856 | A | * | 7/1974 | Uchida | 70/58 X |
| 3,831,407 | A | * | 8/1974 | Coleman | 70/18 |
| 3,837,545 | A | * | 9/1974 | Rogers, Jr. | 224/31 |
| 3,882,700 | A | * | 5/1975 | Dunlap et al. | 70/59 |
| 3,896,643 | A | * | 7/1975 | Kawakami | 70/59 |
| 4,024,738 | A | * | 5/1977 | Pi | 70/59 |
| 4,063,637 | A | * | 12/1977 | Danforth | 70/59 X |
| 4,065,945 | A | * | 1/1978 | Jaulmes | 70/58 |
| 4,096,715 | A | * | 6/1978 | Lipschutz | 70/59 |
| 4,201,398 | A | * | 5/1980 | Meier | 70/59 X |
| 4,274,271 | A | * | 6/1981 | Todd et al. | 70/59 |
| 4,676,080 | A | * | 6/1987 | Schwarz | 70/59 |
| 4,733,805 | A | * | 3/1988 | Sawada | 224/39 |
| 5,531,364 | A | * | 7/1996 | Buis | 224/413 |
| 5,564,129 | A | * | 10/1996 | Ball et al. | 70/59 X |
| 5,634,358 | A | * | 6/1997 | Myers | 70/233 |
| 5,664,444 | A | * | 9/1997 | Schaan | 70/14 |
| 5,718,137 | A | * | 2/1998 | Huston | 70/423 |
| 5,884,825 | A | * | 3/1999 | Schroeder | 224/413 |
| 6,116,064 | A | * | 9/2000 | Driscoll | 70/59 |

* cited by examiner

Primary Examiner—Suzanne Dino Barrett
(74) Attorney, Agent, or Firm—Charles J. Kulas

(57) ABSTRACT

A helmet can be secured using a front fork lock by placing an end of the motorcycle's handlebars through the helmet and then locking the handlebars. In some configurations a sturdy protrusion, such as metal, graphite, etc., is affixed to an end of the handlebars or to a part of the motorcycle frame to make removal of the helmet in the locked position impossible, or very difficult. Different embodiments disclose a protrusion attached to an end of a hand grip, to a swing point on a handlebar, or some other portion of a handlebar. Protrusions can also be affixed to the motorcycle frame. Protrusions can be made to swing out for securing a helmet and to swing flush with the motorcycle frame to prevent unwanted encumbrance to a rider. Other embodiments disclose protective ways to attach the protrusions so that they cannot be easily removed.

9 Claims, 4 Drawing Sheets

MOTORCYCLE HELMET LOCK USING FRONT FORK LOCK

BACKGROUND OF THE INVENTION

This invention relates in general to security devices and more specifically to a motorcycle helmet lock for securing a helmet to a motorcycle.

Motorcycle helmets are bulky and it is desirable to secure them to a motorcycle when arriving at a destination. However, these helmets are also expensive and are often the target of thieves or vandals. Prior art uses metal cables or chains with a lock to allow a user to secure the helmet to a part of the motorcycle. However, these approaches require a motorcycle rider to carry heavy and burdensome chains and locks. Also, chains and cables can be cut with a chain cutter.

Another prior art approach allows helmets to be locked in compartments, such as side bags, or cases; that are mounted to the motorcycle. However, not all motorcycles have such devices and these devices are large and tend to detract from a motorcycle's performance and aesthetic beauty and are often not used.

Another approach uses a "helmet lock" that is integrated into the motorcycle. Usually this is a small lock operable with a key. The lock has a tiny arm that goes through a buckle on a cloth strap on the motorcycle's helmet. However, the helmet is quite easily removed from this type of helmet lock by simply cutting the helmet strap with a knife.

Examples of prior art helmet locks can be found in, e.g., U.S. Pat. No. 6,116,064 "Telescoping Motorcycle Helmet Lock" and U.S. Pat. No. 5,531,364 "Anti-theft cage for securing a helmet on a motorcycle."

SUMMARY OF THE INVENTION

The invention uses a front fork lock that is commonly found on motorcycles to lock handlebars in a full left turn position to prevent theft of the motorcycle. A helmet can be secured using the fork lock by placing an end of the handlebars through the helmet and then locking the handlebars in a fixed position. In some configurations a sturdy protrusion, such as metal, graphite, etc., is affixed to the handlebar or to a part of the motorcycle frame to make removal of the helmet in the locked position impossible, or very difficult.

Different embodiments disclose a protrusion attached to an end of a hand grip, a swing or pivot point on a handlebar, or some other portion of a handlebar. Protrusions can also be affixed to the motorcycle frame. Protrusions can be made to swing out for securing a helmet and to swing flush with the motorcycle frame to prevent unwanted encumbrance to a rider. Other embodiments disclose protective ways to attach the protrusions so that they cannot be easily removed.

In one embodiment the invention provides a helmet lock for a motorcycle including a fork lock, a frame component and handlebar assembly. The fork lock can be in a locked configuration that locks at least a portion of the handlebars in a fixed position with respect to the frame component. The fork lock can be in an unlocked configuration that allows the at least a portion of the handlebar assembly to be moved to steer the motorcycle. The helmet lock comprises a securing part for securing a helmet to the motorcycle in the locked configuration so that the helmet can not be removed and for permitting removal of the helmet in the unlocked configuration.

Another embodiment discloses a method for securing a helmet to a motorcycle, wherein the motorcycle includes a fork lock, the method comprising using the fork lock to secure the helmet to the motorcycle.

DETAILED DESCRIPTION OF A PREFERRED EMBODIMENT

Figure 1A:
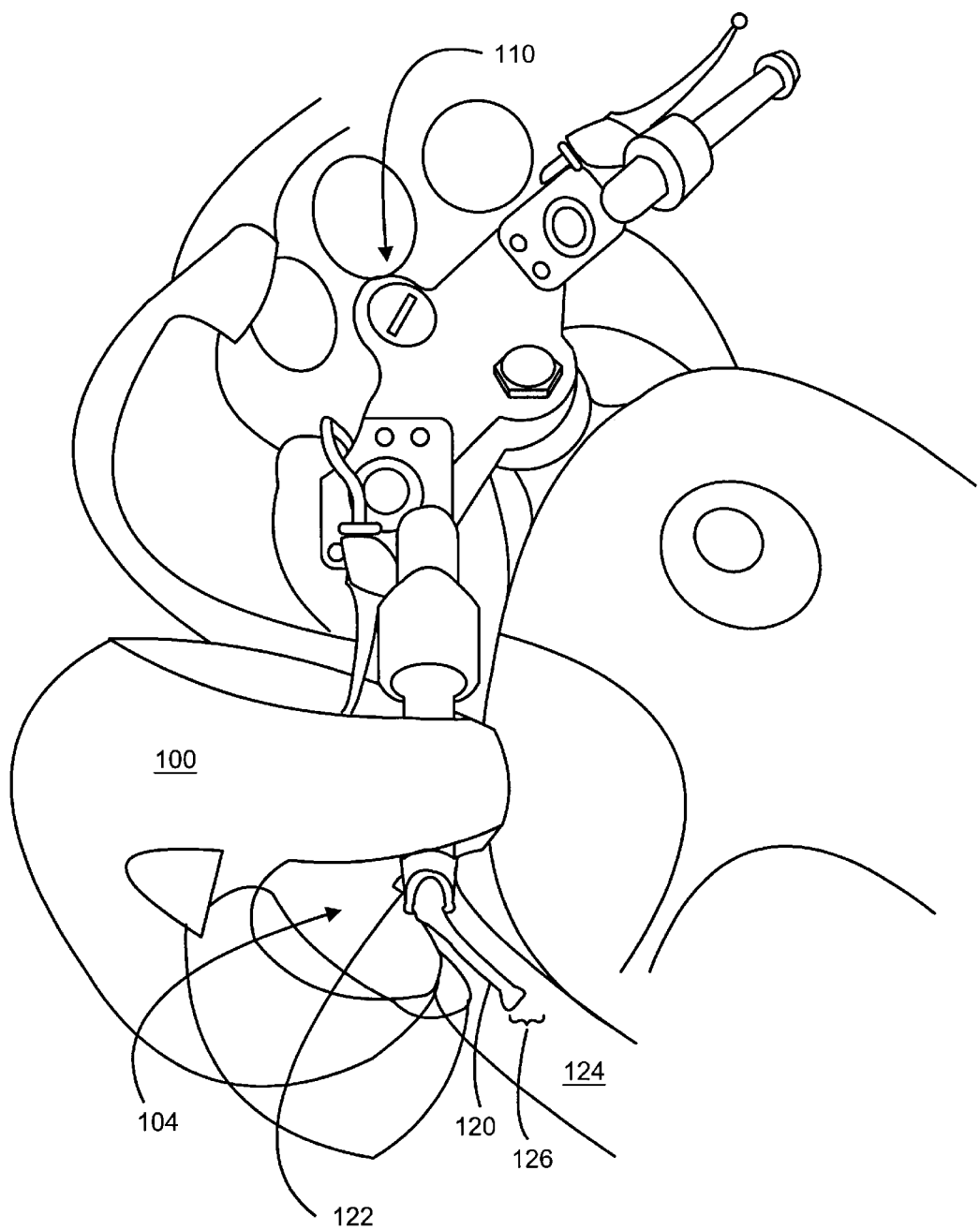
FIG. 1A illustrates a securing part in a locked position.

FIG. 1A illustrates a securing part in a locked position.

In FIG. 1A, helmet 100 has a neck opening 102 and face opening 104. The left arm of a motorcycle's handlebar assembly passes through neck opening 102 and face opening 104. The handlebars are shown in a locked position where lock 110 is used to prevent the handlebar assembly from moving from its full-left position shown in FIG. 1A. The full-left position is where the handlebars are turned essentially fully to the left side as if a rider of the motorcycle were making a hard left turn. In this position, the handlebars can be locked and prevented from moving using front fork lock 110. Front fork lock 110 is operable with a key in a manner that is well-known in the art.

Securing part 120 is an elongated bar of sturdy material such as stiff metal. In a preferred embodiment, securing part 120 is attached to left end 122 of the handlebar assembly at one end of the securing part. Securing part 120 closely abuts a part of the motorcycle, such as motorcycle frame 124 in a region at other end 126 of the securing part. Thus, in the locked position of the handlebar assembly, a helmet is secured to the motorcycle and can not be easily removed.

Figure 1B:
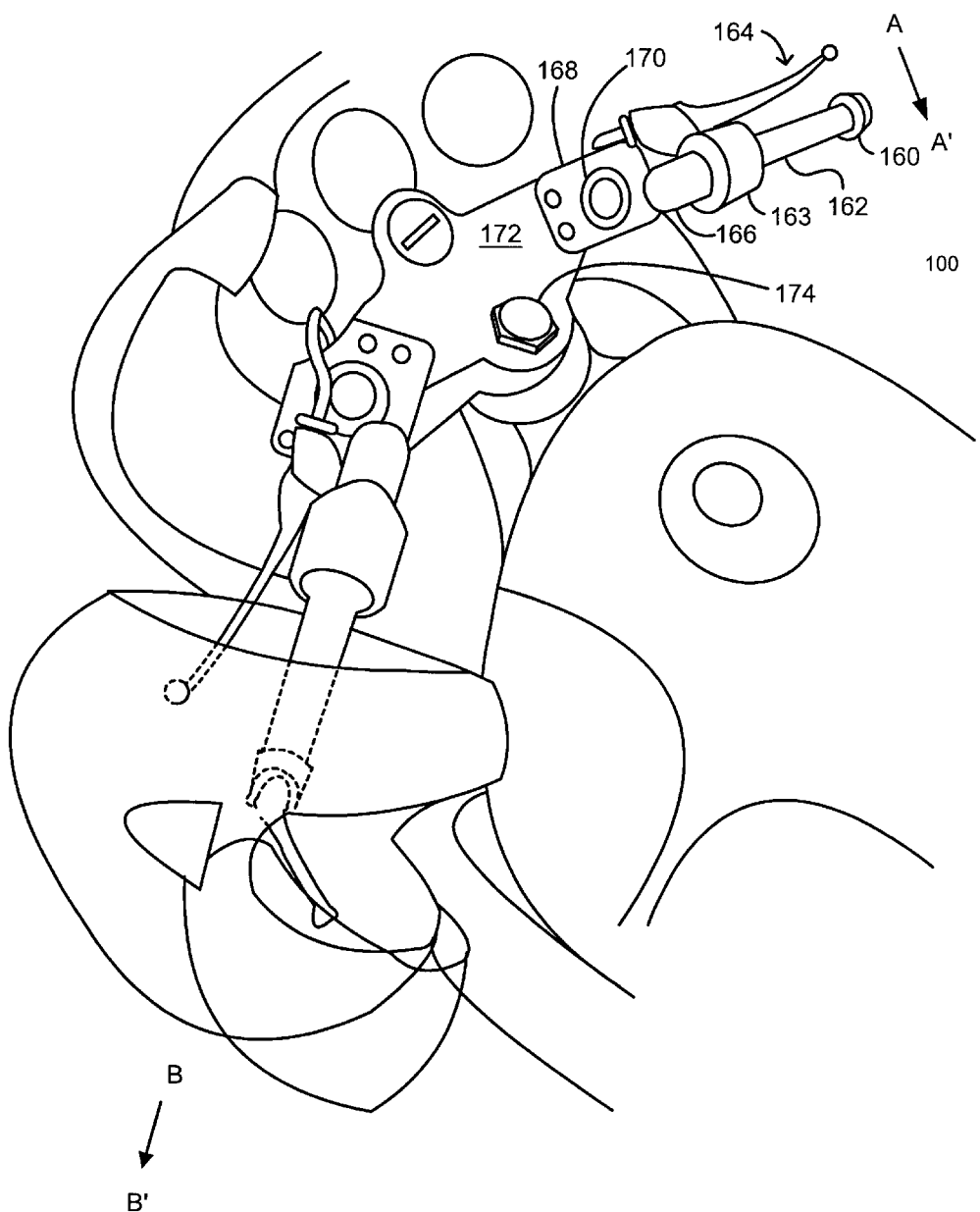
FIG. 1B shows a handlebar assembly in an unlocked position.

FIG. 1B shows the handlebar assembly turned slightly to the right in the direction A–A'. When the handlebar assembly is unlocked, the handlebar assembly can be turned to the right so that the securing part is moved away from the motorcycle frame and the helmet can be easily removed from the handlebars in the direction B–B' of FIG. 1B. Also illustrated in FIG. 1B are different portions of the handlebar assembly (for the right side) including end 160, handgrip 162, handgrip stop 163, lever 164, handlebar joining portion 166, fork plate 168, fork nut 170 [CHECK], pivot plate 172 and pivot point 174. These portions are repeated for the left side of the assembly.

Naturally, other types of handlebar assemblies can have more, less or different portions. Any handlebar assembly portion or other movable portion of a motorcycle can be used to provide a securing part to lock a helmet in accordance with the invention. Different embodiments of the invention can use variations of the securing part or other components to assist in securing a helmet (or other item) to a motorcycle by using the front fork lock mechanism. Some of these variations are next discussed.

Figure 2A:
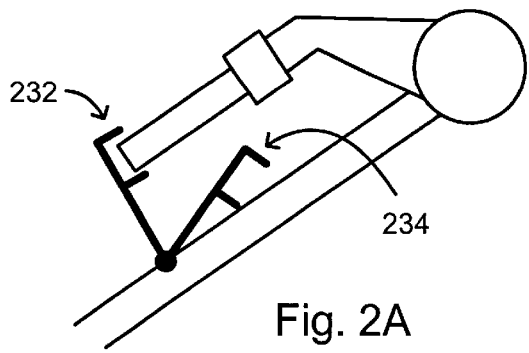
FIG. 2A shows a swingable securing part.

FIG. 2A shows a swingable securing part. FIGS. 2A–D show simplified overhead schematics of handlebar assembly left-side 202 and frame part 204. In FIG. 2A, a securing part is rotatably attached to a frame component of a motorcycle so that it is held adjacent to the frame when not in use, as shown in position 232, and so it can swing out from the frame to cup an end of the handlebar assembly as shown in position 234. In a preferred embodiment the swingable securing part is provided with a hollowed cylinder, or cylinder section, or merely flanges, to more effectively "cup" the end of the handlebar and make it difficult to move the swingable securing part apart from the handlebar end when the handlebar assembly is in the locked position.

Figure 2B:
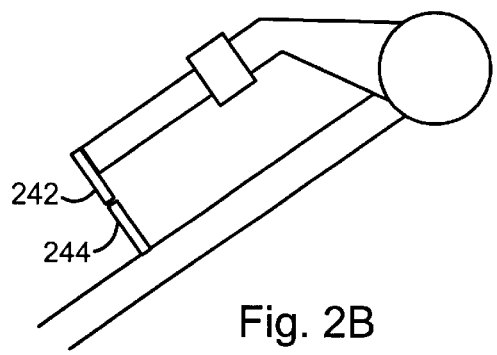
FIG. 2B shows a two-piece design for a securing part.

FIG. 2B shows a two piece design where first securing part 242 is attached to an end of the handlebar while second securing part 244 is attached to a part of the frame. In the locked position the two parts can abut, adjoin, overlap, etc., to make it difficult to remove a helmet secured by the handlebars.

Figure 2C:
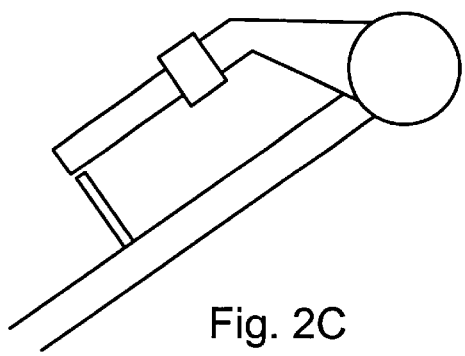
FIG. 2C shows a securing part end adjacent to a handlebar assembly.

FIG. 2C shows an embodiment where a securing part is attached to a part of the frame and a securing part end is adjacent to the handlebar assembly end.

Figure 2D:
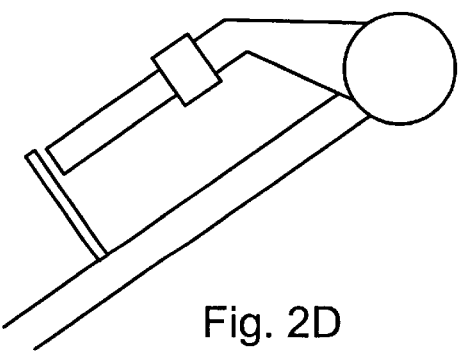
FIG. 2D shows a securing part abutting a handlebar assembly.

FIG. 2D shows an embodiment where a securing part is attached to a part of the frame and a securing part end abuts a handlebar assembly end.

Figure 2E:
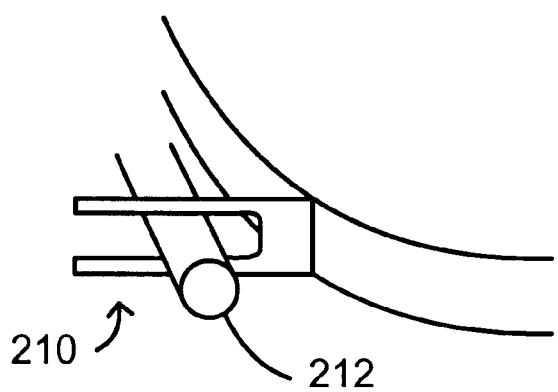
FIG. 2E shows a securing part with a "U" shape to more effectively mate to a handgrip.

FIG. 2E shows an embodiment where a securing part 210 has a "U" shape to more effectively mate to a part of the handlebar assembly such as handgrip 212. The U shaped securing part can be swingable or fixed. Other shapes can be used.

Note that many variations are possible. The specific embodiments described herein can be modified or combined with those disclosed herein or with other designs.

In some embodiments it may be possible to integrate a securing part into another part needed part of a handlebar assembly, frame or accessory to a motorcycle. For example, a securing part may be created from a handgrip assembly, hand protector (not shown), hydraulic reservoir (not shown), turn signal switch, etc. Although a preferred embodiment uses the end of the handlebar assembly as an attachment or abutment point for the securing part, use can be made of any part of the handlebar assembly or other part of the frame, motorcycle or accessory.

Figure 2F:
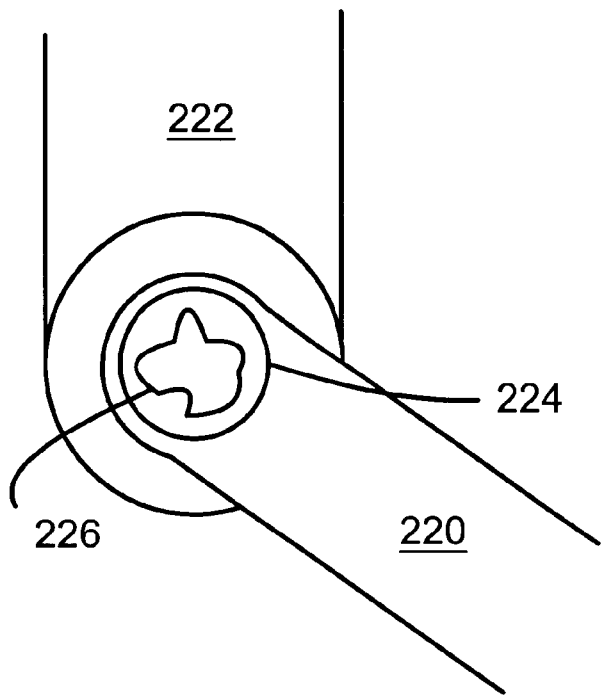
FIG. 2F shows a keyed bolt for attaching a securing part in an after-market application.

FIG. 2F illustrates an after-market installation of a version of the invention. In FIG. 2F, securing part 220 is attached to end 222 of a handgrip by using bolt 224 with keyed circular slot 226. Traditional handgrip ends may be provided with a threaded receptacle so that the handgrip can be removed, e.g., for replacing the hand grips. This threaded receptacle can also receive an appropriately-designed securing part. The securing part includes a threaded bolt that is turned by inserting a tool that is keyed to circular slot 226 in a manner that is known in the art similar to keyed lug nuts on automobile wheels.

In general, any point in a handlebar assembly, including portions, or components, shown in FIGS. 1A and B can be used in conjunction with a securing part to secure a helmet. The motorcycle frame is considered any part that is not the handlebar assembly.

A "securing part" can be one or more components, protrusions, bars, structures, designs, etc., on the handlebar assembly or frame. Anything that prevents the helmet from being removed when the front fork lock is used to secure the handlebars can be considered a securing part. The securing part can be made from any suitable material including metal, plastic, composite materials, etc. The securing part need not be strictly rigid but can be flexible. The securing part can be made removable, in whole or in part, from the handlebars and/or motorcycle frame. Other embodiments can include a securing part as a part of the motorcycle helmet.

In other embodiments it may be possible to secure a helmet to the handlebars, or other part of the motorcycle, using the fork lock mechanism in ways not specifically disclosed in this application. For example, motorcycle helmet designs might provide additional openings (e.g., for vents, design, comfort, etc.) that allow a portion of the handlebars to pass through the helmet securely. A helmet can be provided with a built-in loop or other opening specifically for the purpose of securing it to a handlebar assembly, or other part of a motorcycle, that is secured with the front fork lock. For example, a more complex design can provide an independent mechanism such as a loop of cable that is locked with the front fork locking mechanism. A linkage can be coupled to the handlebar assembly that operates a helmet locking mechanism in the front, or other, part of the motorcycle. Other items besides helmets, such as luggage, articles of clothing, etc., can be locked in manners similar to those discussed for helmets, herein.

Thus, the invention has been discussed with respect to various embodiments thereof. Many variations on the embodiments are possible which remain within the scope of the invention. The disclosure is to be regarded as illustrative, not restrictive of the invention, the scope of which is determined by the appended claims.

What is claimed is:

1. A helmet lock, wherein a vehicle includes a fork lock, a frame component and handlebar assembly, wherein the fork lock in a locked configuration locks at least a portion of the handlebar assembly in a fixed position with respect to the frame component, wherein the fork lock in an unlocked configuration allows the at least a portion of the handlebar assembly to be moved to steer the vehicle, the helmet lock comprising a securing part for securing the helmet to the vehicle in the locked configuration, wherein the securing part, the handlebar assembly and the frame component form a closed loop, wherein the handlebar assembly can be passed through the helmet in a locked position so that the helmet can not be removed, and wherein rotation of the handlebar assembly permits removal of the helmet in the unlocked configuration.

2. A helmet lock, wherein a vehicle includes a fork lock, a frame component and handlebar assembly, wherein the fork lock in a locked configuration locks at least a portion of the handlebars in a fixed position with respect to the frame component, wherein the fork lock in an unlocked configuration allows the at least a portion of the handlebar assembly to be moved to steer the vehicle, the helmet lock comprising a securing part for securing a helmet to the vehicle in the locked configuration so that the helmet can not be removed and for permitting removal of the helmet in the unlocked configuration, wherein at least a portion of the handlebar assembly is passed through a portion of the helmet in order to achieve securing.

3. The invention of claim 2, further comprising a protrusion affixed to a portion of the handlebar assembly so that when the fork lock is in the locked position the helmet can not be removed.

4. The invention of claim 3, wherein the handlebar assembly includes a hand grip, wherein the protrusion is affixed to the hand grip.

5. The invention of claim 2, further comprising a protrusion affixed to a portion of at least one frame component so that when the fork lock is in the locked position the helmet can not be removed.

6. The invention of claim 5, further comprising a slot in the protrusion for receiving a portion of the handlebar assembly when the fork lock is in the locked position.

7. The invention of claim 5, further comprising a movable coupling between the protrusion and the portion of at least one frame component so that the protrusion is movably coupled the portion of at least one frame component.

8. A method for securing a helmet to a vehicle, wherein the vehicle includes a fork lock, a frame component and handlebar assembly, wherein the fork lock in a locked configuration locks at least a portion of the handlebars in a fixed position with respect to the frame component, wherein the fork lock in an unlocked configuration allows the at least a portion of the handlebar assembly to be moved to steer the vehicle, the method comprising securing a helmet to the vehicle in the locked configuration so that the helmet can not be removed, wherein at least a portion of the handlebar assembly is passed through a portion of the helmet in order to achieve securing.

9. A method for securing a helmet to a vehicle, wherein the vehicle includes a fork lock, a frame component and handlebar assembly, wherein the fork lock in a locked configuration locks at least a portion of the handlebars in a fixed position with respect to the frame component, wherein the fork lock in an unlocked configuration allows the at least a portion of the handlebar assembly to be moved to steer the vehicle, the method comprising securing a helmet to the vehicle by using a securing part adjacent to both the handlebar assembly and to the frame component, wherein the handlebar assembly can be passed through the helmet in the locked configuration, wherein the securing part is brought out of adjacency by rotation of the handlebar assembly in the unlocked configuration.

\* \* \* \* \*